United States Patent
Yukimasa

(10) Patent No.: US 11,606,827 B2
(45) Date of Patent: Mar. 14, 2023

(54) COMMUNICATION APPARATUS, CONTROL METHOD OF COMMUNICATION APPARATUS, PROVISION METHOD, AND NON-TRANSITORY COMPUTER READABLE STORAGE MEDIUM

(71) Applicant: CANON KABUSHIKI KAISHA, Tokyo (JP)

(72) Inventor: Koji Yukimasa, Kanagawa (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 88 days.

(21) Appl. No.: 17/159,559

(22) Filed: Jan. 27, 2021

(65) Prior Publication Data
US 2021/0251025 A1  Aug. 12, 2021

(30) Foreign Application Priority Data
Feb. 7, 2020 (JP) .............................. JP2020-020074

(51) Int. Cl.
 *H04W 4/00* (2018.01)
 *H04W 76/11* (2018.01)
 *H04W 48/10* (2009.01)
(52) U.S. Cl.
 CPC ............ *H04W 76/11* (2018.02); *H04W 48/10* (2013.01)
(58) Field of Classification Search
 CPC ....... H04W 76/11; H04W 48/10; H04W 4/50; H04W 76/10; H04W 48/18; H04W 8/02; H04W 4/60; H04W 48/08; H04W 88/02
(Continued)

(56) References Cited

U.S. PATENT DOCUMENTS 9,865,932 B2  1/2018  Yukimasa
10,637,524 B2  4/2020  Yukimasa
(Continued)

FOREIGN PATENT DOCUMENTS

| EP | 2919446 A1 | 9/2015 |
|---|---|---|
| JP | 2014-512122 T | 5/2014 |
| WO | 2019242728 A1 | 12/2019 |

OTHER PUBLICATIONS

3GPP Standard, Technical Report, "3rd Generation Partnership Project; Technical Specification Group Services and System Aspects; Study on Communication for Automation in Vertical Domains" Release 26, 3rd Generation Partnership Project, Dec. 21, 2018, pp. 1-196.
(Continued)

*Primary Examiner* — Chuong T Ho
(74) *Attorney, Agent, or Firm* — Carter, DeLuca & Farrell LLP

(57) ABSTRACT

A communication apparatus acquires, from an external apparatus, an application for using a communication service using a local network in which communication is performed with a base station, that broadcasts a public land mobile wireless network identifier. The public land mobile wireless network identifier may not be defined in ITU-T Recommendation E.212, using a wireless communication method that supports transmission/reception with a plurality of OFDM subcarrier intervals, the application being bundled with connection setting information for making a connection to the local network, and make a connection to the local network using the connection setting information if the acquired application is active.

9 Claims, 7 Drawing Sheets

(58) Field of Classification Search
USPC .......................................... 370/328, 329, 330
See application file for complete search history.

(56) References Cited

U.S. PATENT DOCUMENTS

| | | | |
|---|---|---|---|
| 2011/0280212 A1* | 11/2011 | Lv ........................ | H04W 74/002 |
| | | | 370/329 |
| 2012/0243437 A1 | 9/2012 | Horn | |
| 2016/0188317 A1 | 6/2016 | Hilliar et al. | |
| 2016/0269165 A1* | 9/2016 | Lorca Hernando ..... | H04L 27/26 |
| 2017/0374706 A1 | 12/2017 | Sharma et al. | |
| 2018/0101334 A1* | 4/2018 | Suzuki ................. | H04N 1/0023 |
| 2018/0198649 A1* | 7/2018 | Lindoff ............. | H04L 27/26412 |
| 2018/0199225 A1* | 7/2018 | Kim .................. | H04W 72/1284 |
| 2019/0174330 A1* | 6/2019 | Wen ....................... | H04W 24/02 |
| 2020/0083995 A1* | 3/2020 | Suzuki ................ | H04L 27/2613 |
| 2022/0028249 A1* | 1/2022 | Saldin ................ | H04L 12/2825 |

OTHER PUBLICATIONS

Extended European Search Report issued by the European Patent Office dated Jul. 19, 2021 in corresponding EP Patent Application No. 21155553.7.

* cited by examiner

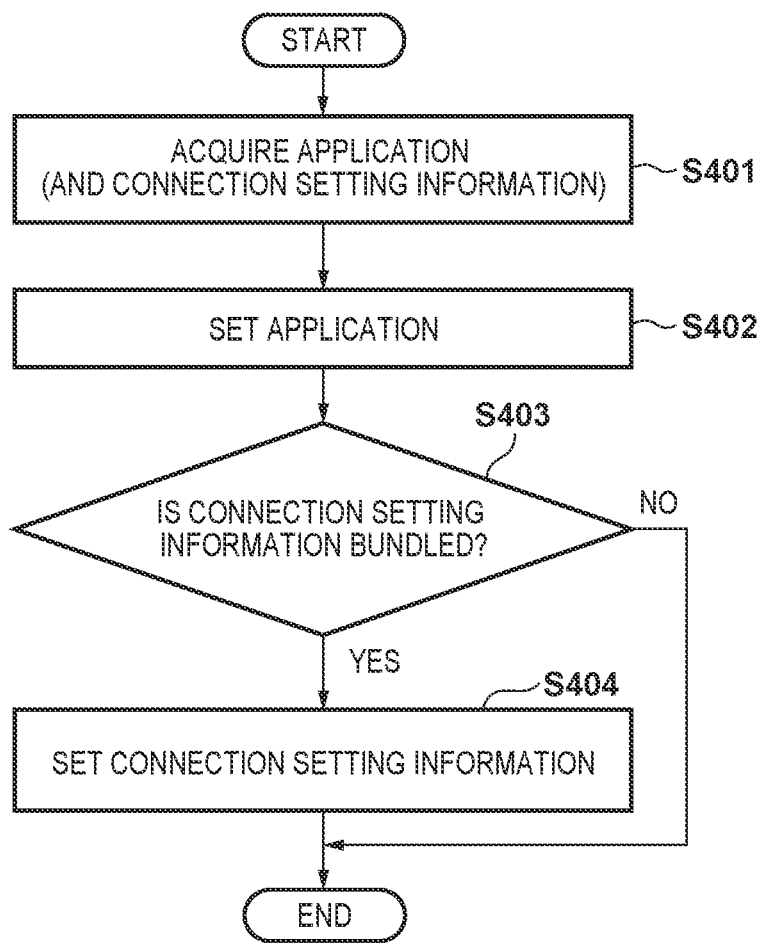

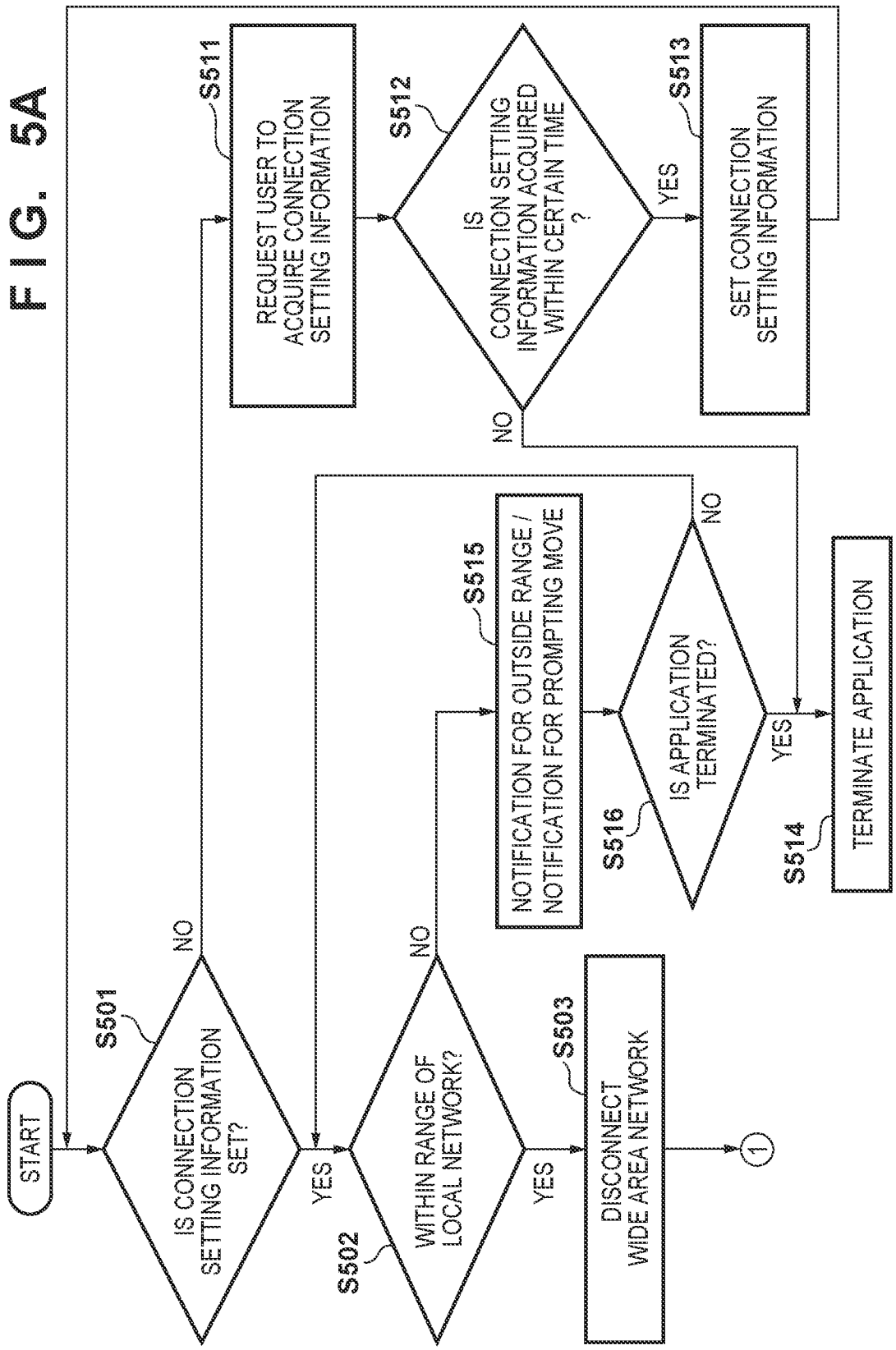

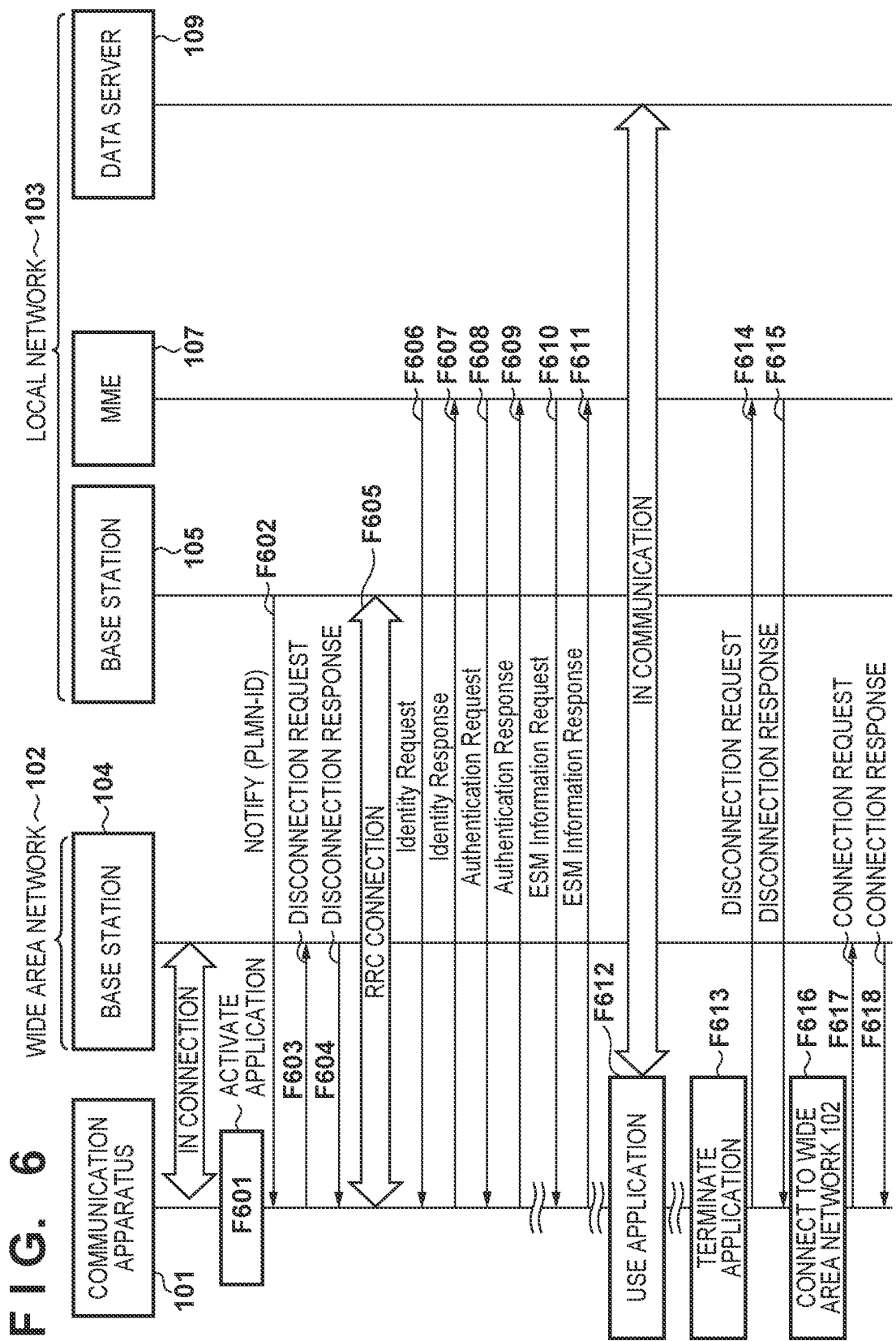

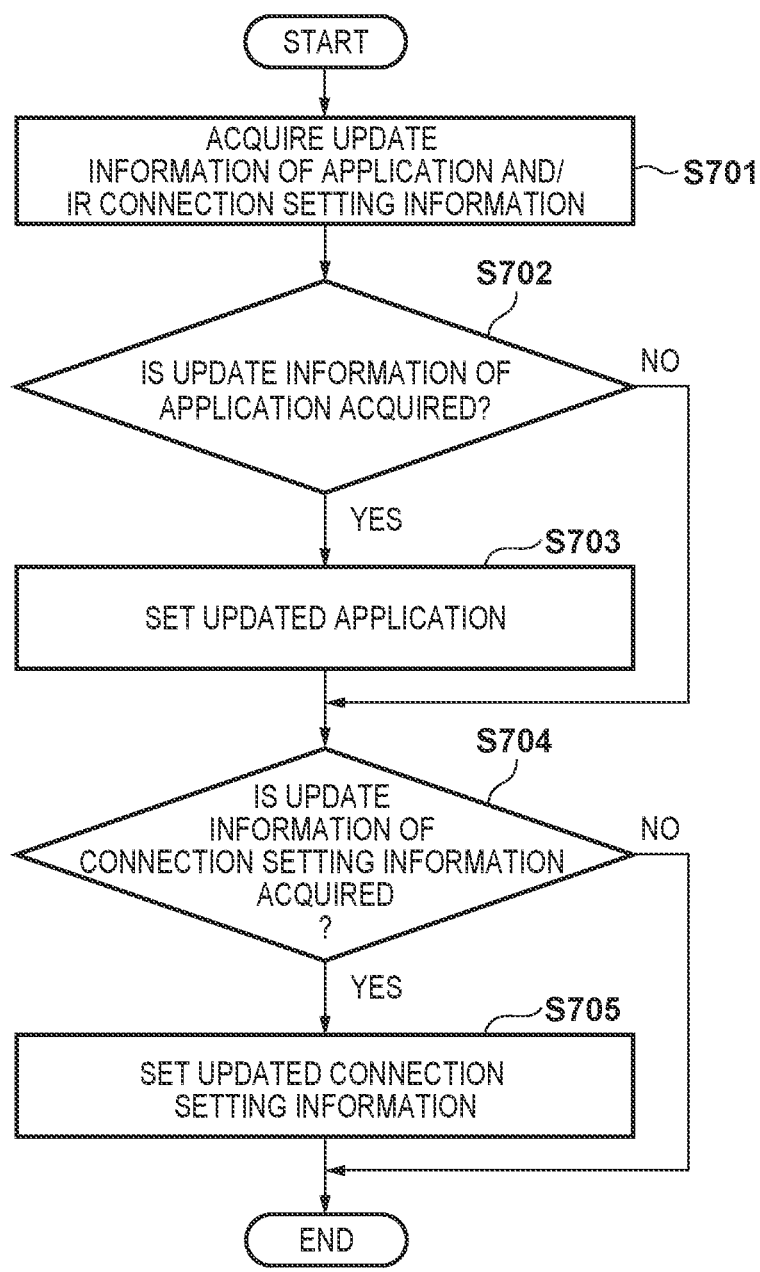

COMMUNICATION APPARATUS, CONTROL METHOD OF COMMUNICATION APPARATUS, PROVISION METHOD, AND NON-TRANSITORY COMPUTER READABLE STORAGE MEDIUM

BACKGROUND OF THE INVENTION

Field of the Invention

The present invention relates to a communication apparatus, a control method of the communication apparatus, a provision method, and a non-transitory computer-readable storage medium.

Description of the Related Art

In recent years, institutionalization of local network systems such as a local 5G and a regional BWA (Broadband Wireless Access) that can be constructed and operated by entities other than communication carriers (carriers) has been promoted according to the needs of regions and industries. It is supposed that applications each of which uses a local network (local 5G or regional BWA and is available only on the local network) become widespread in the future. As examples of the applications, a diagnosis result display application in a hospital, a robot control application in a factory, a watching application in a sports stadium, and the like are conceivable.

Currently, in a terminal apparatus (for example, a smartphone) that uses a public network, setting information for making a connection to the public network is set in advance, and it is generally unnecessary for the user to make the setting. There is also a technique of providing a terminal apparatus with setting information related to a predetermined communication service (for example, P2P communication) so as to enable the terminal apparatus to use the service in a public network (US-2012-0243437). By acquiring the setting information, the terminal apparatus can use the predetermined communication service.

When a terminal apparatus tries to use a service by making a connection to a local network, it is supposed to perform one of the following procedures. In a first procedure, the user of the terminal apparatus manually executes connection setting to the local network in the terminal apparatus. In a second procedure, the terminal apparatus acquires an application for using the local network, acquires setting information for making a connection to the local network using the application, and executes connection setting to the local network using the setting information. This acquisition process is executed by, for example, downloading the application and/or setting information.

However, these procedures have the following problems. That is, in the first procedure, manual connection setting is complicated, and in the second procedure, it is necessary to execute the acquisition process such as downloading twice, e.g. due to the need to acquire both an application for using the local network and settings information for connecting to the local network using the application. Thus, the user convenience is reduced.

SUMMARY OF THE INVENTION

The present invention has been made in consideration of the problems described above and provides a technique for improving the efficiency of a process for making a connection to a local network.

According to one aspect of the present invention, there is provided a communication apparatus which comprises: acquisition means for acquiring, from an external apparatus, an application for using a communication service using a local network in which communication is performed with a base station, that broadcasts a public land mobile wireless network identifier not defined in ITU-T Recommendation E.212, using a wireless communication method that supports transmission and/or reception with a plurality of OFDM subcarrier intervals, the application being bundled with connection setting information for making a connection to the local network; and connection control means for making a connection to the local network using the connection setting information if the application acquired by the acquisition means is active.

According to another aspect of the present invention, there is provided a method performed by a communication apparatus, the method comprises: acquiring, from an external apparatus, an application for using a communication service using a local network in which communication is performed with a base station, that broadcasts a public land mobile wireless network identifier not defined in ITU-T Recommendation E.212, using a wireless communication method that supports transmission and/or reception with a plurality of OFDM subcarrier intervals, the application being bundled with connection setting information for making a connection to the local network; and controlling a connection by making the connection to the local network using the connection setting information if the application acquired in the acquiring is active. communication apparatus which comprises: acquiring, from an external apparatus, an application for using a communication service using a local network in which communication is performed with a base station, that broadcasts a public land mobile wireless network identifier not defined in ITU-T Recommendation E.212, using a wireless communication method that supports transmission and/or reception with a plurality of OFDM subcarrier intervals, the application being bundled with connection setting information for making a connection to the local network; and controlling a connection by making the connection to the local network using the connection setting information if the application acquired in the acquiring is active.

According to another aspect of the present invention, there is provided a method of providing a communication apparatus with an application for using a communication service using a local network in which communication is performed with a base station, that broadcasts a public land mobile wireless network identifier not defined in ITU-T Recommendation E.212, using a wireless communication method that supports transmission/reception with a plurality of OFDM subcarrier intervals, the method comprises: providing the communication apparatus with connection setting information for making a connection to the local network by bundling the connection setting information with the application.

In any of the above-mentioned aspects, the public land mobile wireless network identifier broadcast may be for local 5G and not for (5G using) a public network.

In any of the above-mentioned aspects, the public land mobile wireless network identifier broadcast may be a public land mobile wireless network identifier not defined in ITU-T Recommendation E.212.

In any of the above-mentioned aspects, a PLMN-ID "not defined in ITU-T Recommendation E.212" may mean that the PLMN-ID is not for a public network but is for a local network (i.e. "local 5G").

Further features of the present invention will become apparent from the following description of exemplary embodiments (with reference to the attached drawings).

BRIEF DESCRIPTION OF THE DRAWINGS

FIG. 4 is a flowchart illustrating a process of acquiring and setting connection setting information for a connection to a local network 103;

FIG. 5A and FIG. 5B are flowcharts illustrating a process of making a connection to the local network 103 to use a service;

FIG. 6 is a sequence chart showing a connection to a wide area network 102 and a connection to the local network 103 to be made by the communication apparatus 101; and FIG. 7 is a flowchart illustrating a process of updating an application or connection setting information.

DESCRIPTION OF THE EMBODIMENTS

Figure 1:
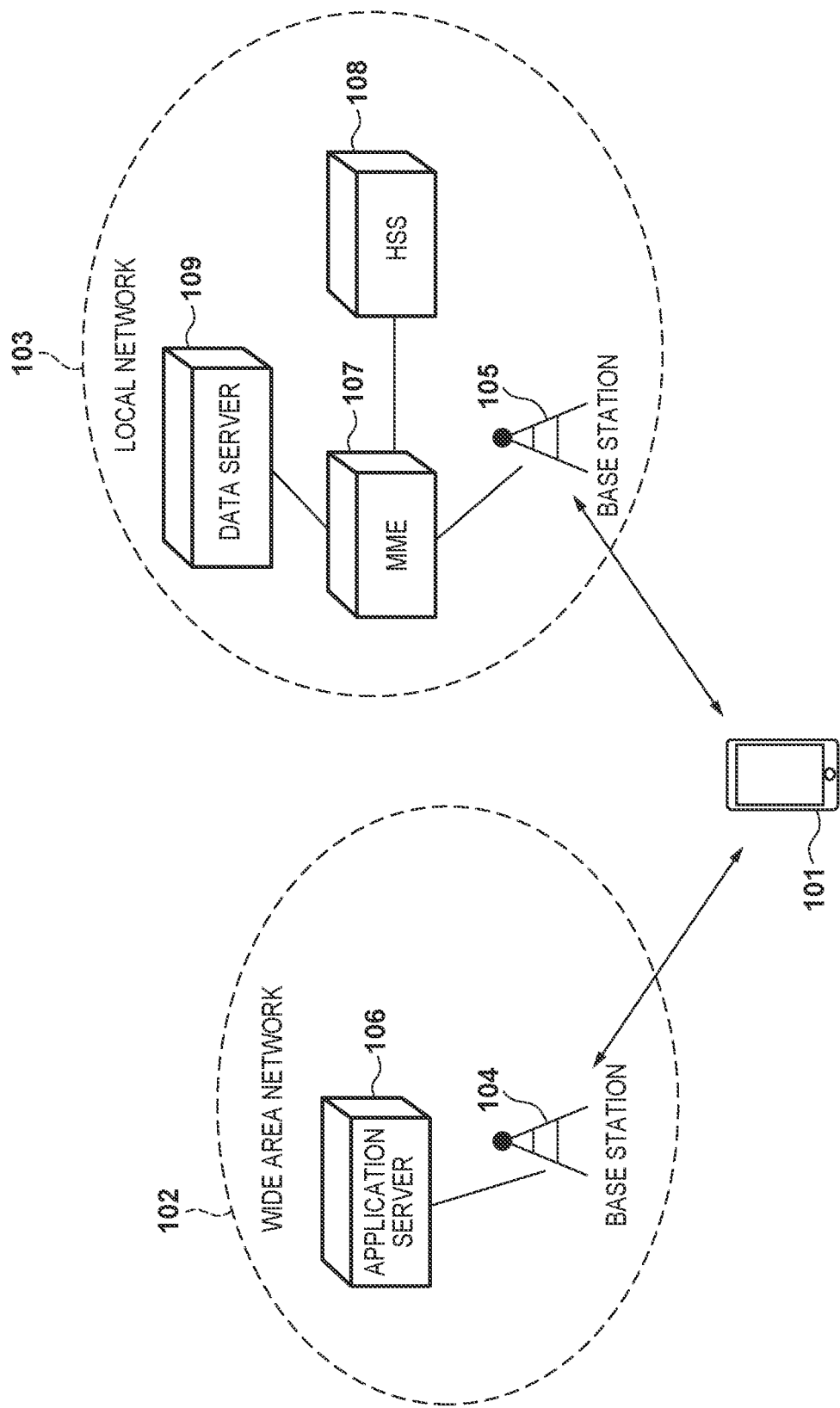
FIG. 1 is a view showing a configuration example of a network.

Hereinafter, embodiments will be described in detail with reference to the attached drawings. Note, the following embodiments are not intended to limit the scope of the claimed invention. Multiple features are described in the embodiments, but limitation is not made an invention that requires all such features, and multiple such features may be combined as appropriate. Furthermore, in the attached drawings, the same reference numerals are given to the same or similar configurations, and redundant description thereof is omitted.

[Network Configuration]

FIG. 1 shows a configuration example of a network according to this embodiment. A wide area network 102 is, for example, a public network of LTE (Long Term Evolution) or the like, or a wireless local area network (wireless LAN) conforming to a standard of the IEEE802.11 series. The term "wide area network 102" is used to distinguish it from a local network 103, and applicable to any network. In the wide area network 102, a base station 104 and an application server 106 exist. The base station 104 is an apparatus that operates the wide area network 102 and is capable communicating with a communication apparatus 101. The base station 104 is also referred to as a node B, an access point, or the like. The application server 106 is a server apparatus capable of providing an application for a service that can be used on the local network 103.

The communication apparatus 101 is a terminal apparatus that can make a connection to the wide area network 102 to perform communication and stores the subscriber information (IMSI (International Mobile Subscriber Identity)) required for the connection. It should be understood by those skilled in the art that the term "communication apparatus" is a non-limiting term that can indicate a smartphone, a laptop, a sensor, a tablet, or the like. The arrangement of the communication apparatus 101 will be described later using FIGS. 2 and 3.

The local network 103 is, for example, a local 5G which is a 5G (5th Generation mobile communication system) system that can be constructed by an entity other than communication carriers, or a regional BWA (Broadband Wireless Access). Further, the local network 103 can be a network in which communication is performed with a base station, that broadcasts (notifies) a public land mobile wireless network identifier not defined in ITU-T Recommendation E.212, using a wireless communication method that supports transmission/reception with a plurality of OFDM subcarrier intervals. ITU-T Recommendation E.212 relates to an identification plan for land mobile stations in an internationally harmonized public land mobile networks (PLMNs) and establishes the principles for allocation of international mobile station identities (IMSI) in such networks with a view to enabling land mobile stations to roam among public land mobile networks located in different countries. In the context of ITU-T Recommendation E.212, therefore, a PLMN-ID is for a public (5G) network and not a local 5G network. In contrast, according to embodiments, the public land mobile address identifier which is broadcast is for local 5G and not a public network. In the local network 103, a base station 105, a mobile communication management apparatus (Mobility Management Entity, which is referred to as MME hereinafter) 107, and a subscriber management apparatus (Home Subscriber Server, which is referred to as HSS hereinafter) 108 exist. Further, a data server 109 that can be used in the local network 103 is included.

[Arrangement of Communication Apparatus]

Figure 2:
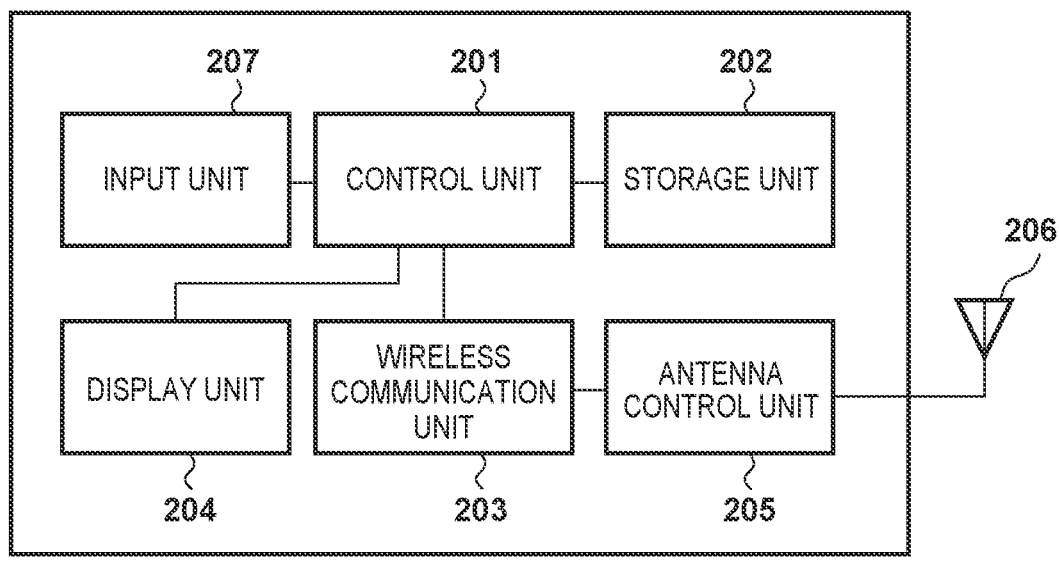
FIG. 2 is a block diagram showing an example of the hardware arrangement of a communication apparatus 101.

Next, the arrangement of the communication apparatus 101 will be described. FIG. 2 is a block diagram showing an example of the hardware arrangement of the communication apparatus 101. A control unit 201 is formed by, for example, one or more processors such as a CPU or an MPU, and controls the entire apparatus by executing the control program stored in a storage unit 202. CPU is an abbreviation for Center Processing Unit, and MPU is an abbreviation for Micro Processor Unit. The storage unit 202 is formed by one or more memories such as a ROM and a RAM, and stores the control program to be executed by the control unit 201, and various kinds of information such as communication parameters, captured image data, an application using communication, and the like. ROM is an abbreviation for Read Only Memory, and RAM is an abbreviation for Random Access Memory. Various kinds of operations to be described later can be performed by the control unit 201 executing the control program stored in the storage unit 202. A wireless communication unit 203 executes control for performing communication in a public network (a cellular network of LTE, 5G, or the like conforming to a 3GPP (3rd Generation Partnership Project) standard) or a local area network (WLAN) conforming to a standard of the IEEE802.11 series. The wireless communication unit 203 performs communication via an antenna control unit 205 that controls an antenna 206. A display unit 204 performs various kinds of display modes. The display unit 204 has a function such as an LCD (Liquid Crystal Display) or an LED (Light Emitting Device) capable of outputting information that can be visually recognized, or a loudspeaker or the like capable of audio output. The display unit 204 has a function of outputting at least either one of visual information and audio information. An input unit 207 is an input unit for performing various kinds of inputs or the like by a user, and has an operation function for operating the communication apparatus 101.

Figure 3:
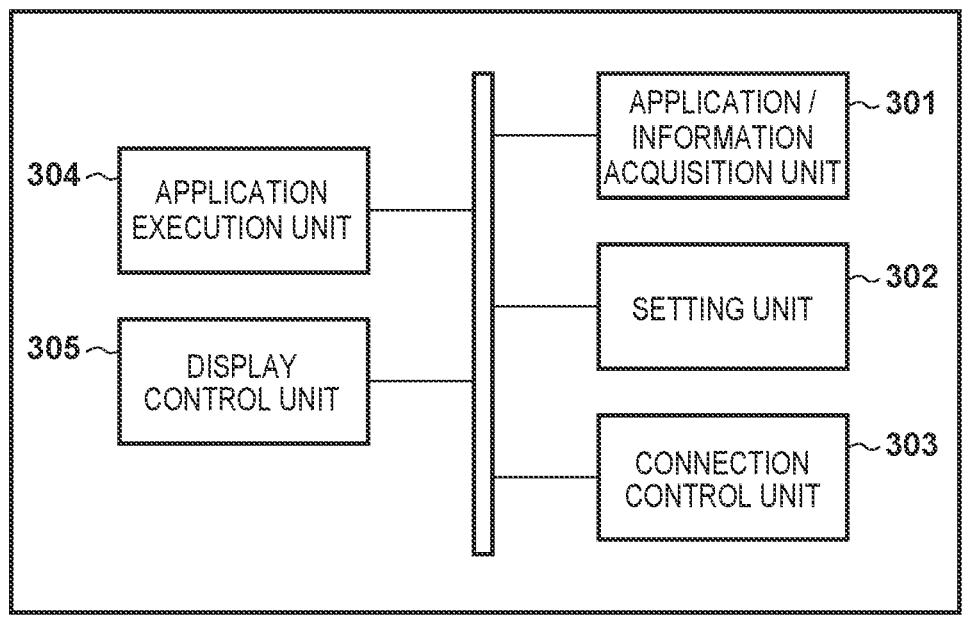
FIG. 3 is a block diagram showing an example of the functional arrangement of the communication apparatus 101.

FIG. 3 is a block diagram showing an example of the functional arrangement of the communication apparatus 101. An application/information acquisition unit 301 acquires an application for using a service on the local network 103 or connection setting information for a connection to the local network 103 (to be merely referred to as connection setting information hereinafter) from, for example, an external apparatus. This acquisition process is executed via, for example, a download process. The application is, for example, a diagnosis result display application in a hospital, a robot control application in a factory, a watching application in a sports stadium, or the like. The connection setting information can include at least one of an access point name (Access Point Name, which is referred to as APN hereinafter), a public land mobile wireless network identifier (Public Land Mobile Networks-IDentifier, which is referred to as PLMN-ID hereinafter), a user name, and a password. Note that the PLMN-ID in the local network 103 can be a PLMN-ID not defined in ITU-T Recommendation E.212. As mentioned, according to embodiments of the invention, a PLMN-ID "defined in ITU-T Recommendation E.212" means that it is for a public network (i.e. 5G), while a PLMN-ID "not defined in ITU-T Recommendation E.212" means that it is not for a public network but for a local network (i.e. so called "local 5G"). Further, the connection setting information may include an IMSI (International Mobile Subscriber Identity) formed by the PLMN-ID and a mobile subscriber identification number (Mobile Subscription Identification Number, which is referred to as MSIN hereinafter). Note that it is also possible to arbitrarily set the MSIN if it is not included in the connection setting information.

A setting unit 302 sets (installs), in the communication apparatus 101, the application and/or information acquired by the application/information acquisition unit 301. The setting unit 302 can also execute an unsetting (uninstallation) process. A connection control unit 303 executes a process for making a connection to another communication apparatus (base station or the like) of a communication target. An application execution unit 304 executes the application acquired by the application/information acquisition unit 301. The application execution unit 304 also executes control for terminating the application. A display control unit 305 controls display on the display unit 204 (FIG. 2).

[Procedure of Process]

Next, the procedure of the process of the communication apparatus 101 will be described. The communication apparatus 101 downloads an application for using a service on the local network 103 and, if connection setting information is bundled with the application (connection setting information is appended thereto), executes a connection process to the local network 103 using the information. FIG. 4 is a flowchart illustrating a process in which the communication apparatus 101 acquires and sets connection setting information for a connection to the local network 103. For example, the process illustrated in FIG. 4 is started according to an operation of the input unit 207 executed by the user while the communication apparatus 101 is within the communication range of the wide area network 102 (that is, while the communication 101 is in connection with the base station 104).

The application/information acquisition unit 301 of the communication apparatus 101 located within the communication range of the wide area network 102 acquires an application for using a service on the local network 103 from the application server 106 by downloading or the like (step S401). If connection setting information is bundled with the application, the application/information acquisition unit 301 also acquires the connection setting information. As has been described above, the connection setting information can include an APN, a PLMN-ID, a user name, a password, an IMSI, or the like. Then, the setting unit 302 sets (installs) data of the acquired application in the communication apparatus 101 (step S402). This setting can be executed automatically or according to an operation of the input unit 207 executed by the user.

Then, the application/information acquisition unit 301 determines whether connection setting information is bundled with the acquired application. If connection setting information is bundled with the application (YES in step S403), the setting unit 302 sets the connection setting information in the communication apparatus 101. If no connection setting information is bundled with the application (NO in step S403), the process is terminated.

Figure 5B:
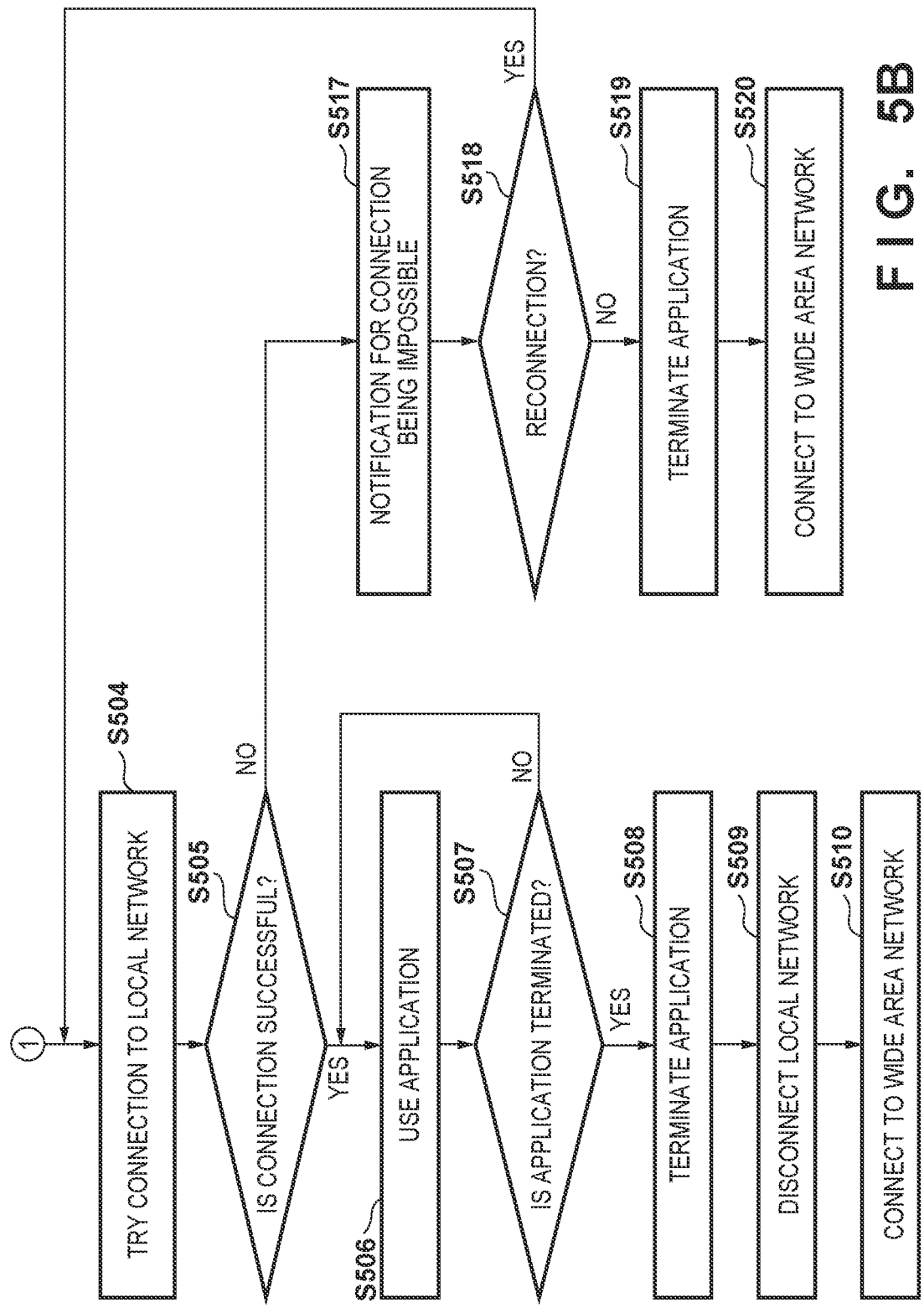

FIG. 5A and FIG. 5B are flowcharts illustrating a process of connecting the communication apparatus 101, in which the application has been set, to the local network 103 to use a service. For example, the process illustrated in FIG. 5A is started when, while the communication apparatus 101 is within the communication range of the wide area network 102, the user operates the input unit 207 and the application execution unit 304 activates the application.

First, the setting unit 302 of the communication apparatus 101 determines whether connection setting information has been set (step S501). If connection setting information has been set in step S404 illustrated in FIG. 4 (YES in step S501), the process advances to step S502; otherwise, the process advances to step S511. In step S502, the connection control unit 303 determines whether the communication apparatus 101 is within the range of the local network 103 (within the communication range thereof). This determination can be executed based on whether the connection control unit 303 can receive a predetermined signal (for example, a signal including a PLMN-ID) from the base station 105 in the local network 103. If the communication apparatus 101 is within the range of the local network 103 (YES in step S502), the connection control unit 303 disconnects the connection with the wide area network 102 (step S503). More specifically, the connection control unit 303 transmits a disconnection request to the base station 104 in the wide area network 102 and, if a disconnection response is received from the base station 104 as a response, disconnects the connection with the wide area network 102. Then, the connection control unit 303 tries a connection to the local network 103 (step S504). Here, as shown in FIG. 6 to be described later, the connection control unit 303 establishes a connection with the base station 105 in the local network 103 and tries a connection to the MME 107 in the local network 103. If a connection to the local network 103 is successfully made (YES in step S505), the application execution unit 304 uses the application to use a service using data in the data server 109 via the communication in the local network 103 (step S506). Examples of the service are a diagnosis result display service in a hospital, a robot control service in a factory, a watching service in a sports stadium, and the like.

Thereafter, if it is instructed to terminate the application by an operation of the input unit 207 by the user of the communication apparatus 101 (YES in step S507), the application execution unit 304 terminates the application (step S508). Further, the connection control unit 303 disconnects the connection with the local network 103 (step S509), and makes a reconnection to the wide area network 102 (step S510).

In the determination in step S501, if it is determined that no connection setting information has been set in the communication apparatus 101 (NO in step S501), the communication apparatus 101 requests the user to acquire connection setting information (step S511). For example, the display control unit 305 displays, on the display unit 204, a screen for requesting (prompting) acquisition of connection setting information. Then, if the application/information acquisition unit 301 acquires connection setting information by downloading or the like within a certain time according to an operation by the user (YES in step S512), the setting unit 302 sets the connection setting information, and the process returns to step S501. If no connection setting information is acquired within the certain time (NO in step S512), the application execution unit 304 terminates the application (step S514).

In the determination in step S502, if the communication apparatus 101 is outside the range of the local network 103 (NO in step S502), the communication apparatus 101 notifies that the communication apparatus 101 is outside the range and/or a move is requested (step S515). For example, the display control unit 305 displays, on the display unit 204, a screen for notifying that the communication apparatus 101 is outside the range and/or requesting (prompting) a move. Thereafter, if it is instructed to terminate the application by an operation of the input unit 207 by the user of the communication apparatus 101 (YES in step S516), the application execution unit 304 terminates the application (step S514). If it is not instructed to terminate the application (NO in step S516), it is determined whether the communication apparatus 101 is within the range of the local network 103 (step S502).

If a connection to the local network 103 is tried in step S504 but the connection is unsuccessfully made (NO in step S505), the communication apparatus 101 notifies that the connection to the local network 103 cannot be made (step S517). For example, the display control unit 305 displays, on the display unit 204, a screen indicating that a connection to the local network 103 cannot be made. Thereafter, if a reconnection is instructed by an operation of the input unit 207 by the user of the connection apparatus 101 (YES in step S518), the connection control unit 303 tries a connection to the local network 103 again. If a reconnection is not instructed (NO in step S518), the application execution unit 304 terminates the application (step S519), and the connection control unit 303 makes a connection to the wide area network 102 (step S520). Note that the order of determination operations in steps S501 and S502 may be reversed.

FIG. 6 is a sequence chart showing a connection to the wide area network 102 and a connection to the local network 103 to be made when the communication apparatus 101 executes an application for using a service on the local network 103. The communication apparatus 101 activates the application (F601) according to an operation via the input unit 207 by the user while it is in connection with the wide area network 102. The communication apparatus 101 detects a broadcast (notification) signal PLMN-ID from the base station 105 in the local network 103 (F602) and, if it is determined that the communication apparatus is within the range of the local network 103, the communication apparatus 101 disconnects the connection with the wide area network 102 (F603 and F604, step S503). Note that the broadcast signal PLMN-ID may be detected after the connection with the wide area network 102 is disconnected. Then, the communication apparatus 101 establishes a wireless network control RRC (Radio Resource Control) connection with the base station 105 (F605). After the RRC connection is established, the communication apparatus 101 receives an identity request from the MME 107 in the local network 103 (F606), and transmits an identity response to the MME 107 (F607). The communication apparatus 101 transmits the identity response including the IMSI included in the connection setting information set in step S404. Then, the communication apparatus 101 receives an authentication request from the MME 107 (F608), and transmits an authentication response to the MME 107 (F609). With this operation, subscriber identification module (Subscriber Identity Module) authentication is performed. Then, the communication apparatus receives an ESM Information Request from the MME 107 (F610), and transmits an ESM information response to the MME 107 (F611). The communication apparatus 101 transmits the ESM information response including the APN, the user name, the password, or the like. With this operation, the communication apparatus 101 is connected to the local network 103. Note that ESM is an abbreviation for EPS (Evolved Packet System) Session Management, and EPS is a general term for IP-based packet networks defined in 3GPP.

With the sequence described above, the communication apparatus 101 is connected to the local network 103, and can use a service of the application using data in the data server 109 (F612, step S506). Thereafter, if the application is terminated according to an operation by the user of the communication apparatus 101 via the input unit 207 (F613, step S508), the communication apparatus 101 is disconnected from the local network 103 (F614 and F615, step S509). Further, the communication apparatus 101 is connected to the wide area network 102 to which it has been connected before the use of the application (F616 to F618, step S510).

FIG. 7 is a flowchart illustrating a process of, after the setting (installation) of the application according to the process illustrated in FIG. 4, updating the application or the connection setting information. For example, the process illustrated in FIG. 7 can be started when the user operates the input unit 207, or automatically started when an update of the application or the connection setting information is requested.

The application/information acquisition unit 301 of the connection apparatus 101 located within the communication range of the wide area network 102 acquires, from the application server 106, update information of the application and/or the connection setting information (step S701). If the update information of the application has been acquired (YES in step S702), the setting unit 302 sets the updated application data in the communication apparatus 101 (step S703). That is, the setting unit 302 updates the current application using the update information. After the update or if no update information of the application has been acquired (NO in step S702), the process advances to step S704. If the update information of the connection setting information has been acquired (YES in step S704), the setting unit 302 sets the updated connection setting information in the communication apparatus 101 (step S705). After the setting or if no update information of the connection setting information has been acquired (NO in step S704), the update process is terminated.

As has been described above, by acquiring (downloading) an application only once, a communication apparatus that uses a service on a local network can acquire connection setting information of the local network, so that it becomes possible to rapidly and efficiently connect the communication apparatus to the local network. This improves the user convenience.

[Modifications]

In the embodiment described above, the communication apparatus 101 disconnects the connection with the wide area network 102 after the application is activated (step S503, F603 and F604), but it may be configured to make a connection to the local network 103 while maintaining the connection with the wide area network 102. Further, in the embodiment described above, the communication apparatus 101 acquires the application and the connection setting information from the application server 106 located in the wide area network 102. However, the application and the connection setting information may be acquired from an apparatus located in the local network 103 if the communication apparatus 101 is in connection with the local network 103. When the application is uninstalled from the communication apparatus 101 based on an operation by the user or the like, the connection control unit 303 can cancel the connection setting or delete the connection setting information. Furthermore, in the embodiment described above, an example has been described in which connection setting information is bundled with an application, but connection setting information may be configured to be included in data of an application.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like. The scope of the following claims is to be accorded the broadest interpretation so as to encompass all such modifications and equivalent structures and functions.

While the present invention has been described with reference to exemplary embodiments, it is to be understood that the invention is not limited to the disclosed exemplary embodiments.

This application claims the benefit of Japanese Patent Application No. 2020-020074, filed Feb. 7, 2020 which is hereby incorporated by reference herein in its entirety.

What is claimed is:
1. A communication apparatus comprising:
at least one memory that stores a set of instructions; and
at least one processor that executes the instructions, wherein the instructions causes, when executed, the communication apparatus to perform operations comprising:
    acquiring an application program for using a communication service using a local network in which communication is performed with a base station, that broadcasts a public land mobile wireless network identifier, using a wireless communication method that supports transmission and/or reception with a plurality of Orthogonal Frequency Division Multiplexing (OFDM) subcarrier intervals, from an external apparatus located in another network different from the local network, while the communication apparatus is connected to a public network different from the local network, wherein the application program is bundled with connection setting information for making a connection to the local network;
    disconnecting a connection with the public network before making a connection to the local network; and
    making the connection to the local network using the connection setting information if the acquired application program is launched on the communication apparatus.

2. The communication apparatus according to claim 1, wherein the connection setting information includes at least one of an access point name (APN), a public land mobile wireless network identifier (PLMN-ID), a user name, and a password.

3. The communication apparatus according to claim 1, wherein the operations further comprise:
executing a communication service after the communication apparatus establishes a connection to the local network, and
disconnecting the connection with the local network and making a reconnection to the public network after the execution of the communication service is terminated.

4. The communication apparatus according to claim 1, wherein the operations further comprise acquiring update information of the application program and/or the connection setting information from the external apparatus after the application program is acquired.

5. The communication apparatus according to claim 1, wherein the operations further comprise acquiring update information of the application program and/or the connection setting information from an apparatus located in the local network after the application program is acquired.

6. The communication apparatus according to claim 1, wherein the local network is a local 5G which is a 5G (5th Generation mobile communication system) system that can be constructed by an entity other than communication carriers.

7. The communication apparatus according to claim 1, wherein the local network is a regional BWA (Broadband Wireless Access).

8. A method performed by a communication apparatus, the method comprising:
    acquiring an application program for using a communication service using a local network in which communication is performed with a base station, that broadcasts a public land mobile wireless network identifier, using a wireless communication method that supports transmission and/or reception with a plurality of Orthogonal Frequency Division Multiplexing (OFDM) subcarrier intervals, from an external apparatus located in another network different from the local network, while the communication apparatus is connected to a public network different from the local network, wherein the application program is bundled with connection setting information for making a connection to the local network;

disconnecting a connection with the public network before making a connection to the local network; and controlling a connection by making the connection to the local network using the connection setting information if the acquired application program is launched on the communication apparatus.

9. A non-transitory computer-readable storage medium storing a computer program for causing a computer to execute a method performed by a communication apparatus, the method comprising:

acquiring an application program for using a communication service using a local network in which communication is performed with a base station, that broadcasts a public land mobile wireless network identifier, using a wireless communication method that supports transmission and/or reception with a plurality of Orthogonal Frequency Division Multiplexing (OFDM) subcarrier intervals, from an external apparatus located in another network different from the local network, while the communication apparatus is connected to a public network different from the local network, wherein the application program is bundled with connection setting information for making a connection to the local network;

disconnecting a connection with the public network before making a connection to the local network; and controlling a connection by making the connection to the local network using the connection setting information if the acquired application program is launched on the communication apparatus.

\* \* \* \* \*